United States Patent [19]

Kuivamaki

[11] Patent Number: 4,689,512

[45] Date of Patent: Aug. 25, 1987

[54] ELECTRIC MOTOR

[75] Inventor: Ismo Kuivamaki, Hyvinkaa, Finland

[73] Assignee: Elevator GmbH, Baar, Switzerland

[21] Appl. No.: 867,675

[22] Filed: May 28, 1986

[30] Foreign Application Priority Data

Jun. 6, 1985 [FI] Finland .................................. 852267

[51] Int. Cl.⁴ .............................................. H02K 5/00
[52] U.S. Cl. ........................................ 310/89; 310/42; 310/91; 310/157
[58] Field of Search ..................... 310/89, 91, 258, 42, 310/157

[56] References Cited

U.S. PATENT DOCUMENTS

| 3,343,016 | 9/1967 | Lewis | 310/91 |
| 4,250,423 | 2/1981 | Linscott, Jr. | 310/258 |
| 4,341,968 | 7/1982 | Borden | 310/258 |

FOREIGN PATENT DOCUMENTS

| 0611877 | 8/1935 | Fed. Rep. of Germany | 310/89 |
| 0745452 | 3/1944 | Fed. Rep. of Germany | 310/157 |
| 0026038 | 2/1980 | Japan | 310/89 |
| 0060436 | 1/1948 | Netherlands | 310/258 |
| 0049745 | 10/1965 | Poland | 310/89 |

Primary Examiner—R. Skudy
Attorney, Agent, or Firm—Bell & Arkin

[57] ABSTRACT

An electric motor, e.g. for use in a hydraulic elevator, has a stator surrounding a rotor and a stator frame around the stator, to which frame end flanges of the motor are secured. The stator frame is formed by a metal sheet bent into the form of a trough, in which the stator is mounted.

3 Claims, 2 Drawing Figures

ELECTRIC MOTOR

FIELD OF THE INVENTION

The present invention relates to an electric motor, e.g. for a hydraulic elevator, the motor having a stator surrounding a rotor and a stator frame around the stator, end flanges of the motor being secured to the stator frame.

BACKGROUND OF THE INVENTION

A primary drawback of prior art electric motors of this type is that the manufacture of the stator frame involves very many steps and is therefore expensive. The stator frame itself consists of a tube to which bracing structures, the mounting legs of the motor and end flanges are welded, all this being further followed by machining operations.

BRIEF SUMMARY OF THE INVENTION

It is an object of the present invention, therefore, to provide a novel electric motor, primarily for use in hydraulic elevators, having a simplified construction.

According to the present invention, there is provided an electric motor comprising a rotor, a stator surrounding the rotor, a stator frame around the stator, and end flanges secured to the stator frame, the stator frame comprising a sheet bent into the form of a trough and the stator being mounted in the trough.

With the aid of the invention, the manufacture of the stator frame is simple and inexpensive because the price of the raw material, for instance of 3-mm metal sheet, is substantially less than that of tube material. All machining steps can also be accomplished in one and the same machine.

In a preferred embodiment of the invention, the sheet has longitudinal margins bent, prior to the shaping of the trough, to form fixing legs, fixing holes being provided in the longitudinal margins and the longitudinal margins being directed inwardly towards each other after the trough has been formed.

Therefore, the fixing legs of the electric motor can also be produced from the same sheet blank and there is no need to weld on separate legs.

BRIEF DESCRIPTION OF THE DRAWINGS

Further features, advantages and objects of the invention will be apparent from the following description thereof in conjunction with the accompanying drawing, wherein.

DESCRIPTION OF THE PREFERRED EMBODIMENT

Figure 1:
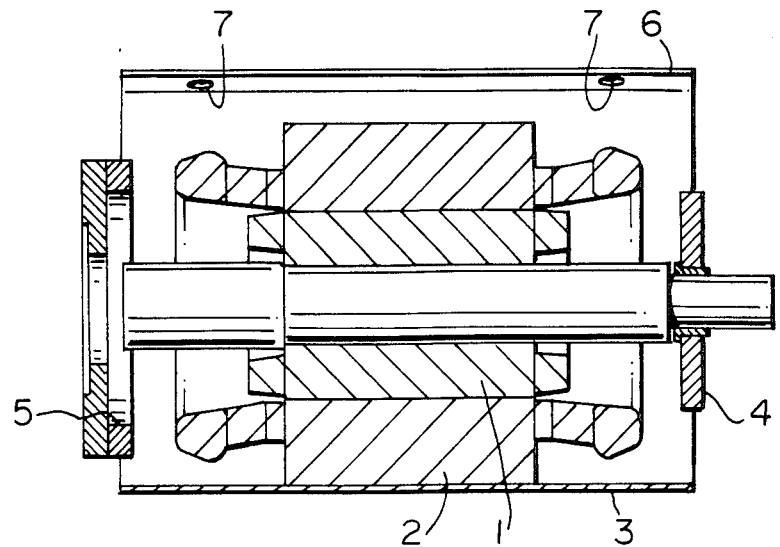
FIG. 1 presents a view taken in vertical longitudinal cross-section through an electric motor according to the invention.
Figure 2:
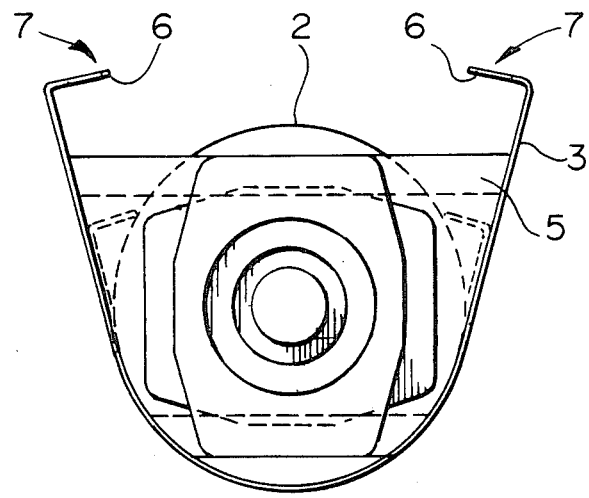
FIG. 2 shows the electric motor of FIG. 1, in end view.

The electric motor shown in the drawing has a rotor 1, a stator 2 surrounding the rotor 1 having a horizontal axis and a stator frame or housing 3 having a horizontally elongate, upwardly open shape of generally U-shaped cross-section around the stator 2, to which frame the stator 2 and end flanges 4, 5 of the motor at opposite ends of the frame are secured.

The stator frame 3 comprises a metal sheet bent into the form of a trough, the stator 2 being affixed to this trough. The longitudinal margins of the sheet have, before the trough forming operation, been angulated to form fixing legs or securement portions 6 and have been provided with fixing holes 7, the angulated margins pointing inwardly towards each other after the trough has been bent.

The motor, intended for a hydraulic elevator is suspended with the trough by means of the fixing holes 7 and entirely submerged in oil. On the flange 5 of the electric motor is mounted a hydraulic pump, which is not shown because it is not truly related to the invention.

It will be apparent to a person skilled in the art that the invention is not confined to the example presented in the foregoing and that it may vary within the spirit and scope of the claims appended hereto.

I claim:

1. An electric motor comprising:
   a rotor having a horizontal axis of rotation;
   a stator surrounding said rotor;
   a stator frame around said stator; and
   end flanges secured to said stator frame;
   said stator frame comprising a metal sheet bent into the form of a trough which is horizontally elongate and upwardly open and said stator being mounted in said trough;
   said sheet having longitudinal margins bent, prior to the shaping of said trough, to form fixing legs above said stator and fixing holes in said longitudinal margins; and
   said longitudinal margins being directed inwardly towards each other after the trough has been formed.

2. An electric motor according to claim 1, further comprising end flanges secured to said stator frame at opposite ends of said stator frame.

3. An electric motor comprising:
   a housing formed of bent sheet metal;
   said housing having a horizontally elongate, upwardly open shape of generally U-shaped cross-section;
   end flanges secured to said housing at opposite ends thereof;
   a rotor; and
   a stator surrounding said rotor within said housing;
   longitudinal marginal edge portions of said sheet metal being bent to form inturned securement portions projecting inwardly, with respect to said housing, above said stator, and holes being formed in said marginal edge portions to facilitate securement of said motor.

* * * * *